United States Patent
Manolakos et al.

(10) Patent No.: US 11,533,144 B2
(45) Date of Patent: Dec. 20, 2022

(54) INDICATION OF TIME-FREQUENCY SYNCHRONIZATION SIGNAL BLOCK (SSB) LOCATIONS OF NEIGHBORING TRANSMISSION-RECEPTION POINTS FOR POSITIONING REFERENCE SIGNAL PUNCTURING PURPOSES

(71) Applicant: QUALCOMM Incorporated, San Diego, CA (US)

(72) Inventors: Alexandros Manolakos, Escondido, CA (US); Hung Dinh Ly, San Diego, CA (US); Sony Akkarakaran, Poway, CA (US); Guttorm Ringstad Opshaug, Redwood City, CA (US); Sven Fischer, Nuremberg (DE); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/992,401

(22) Filed: Aug. 13, 2020

(65) Prior Publication Data
US 2021/0050986 A1 Feb. 18, 2021

Related U.S. Application Data

(60) Provisional application No. 62/887,595, filed on Aug. 15, 2019.

(51) Int. Cl.
*H04L 5/00* (2006.01)
*H04W 72/04* (2009.01)
*H04L 1/00* (2006.01)

(52) U.S. Cl.
CPC .......... *H04L 5/0048* (2013.01); *H04L 5/0005* (2013.01); *H04L 5/0053* (2013.01);
(Continued)

(58) Field of Classification Search
CPC ... H04L 5/0005; H04L 5/0048; H04L 5/0053; H04L 5/0094; H04W 72/042
See application file for complete search history.

(56) References Cited

U.S. PATENT DOCUMENTS

| | | | |
|---|---|---|---|
| 2012/0015667 A1* | 1/2012 | Woo | H04W 64/006 455/456.1 |
| 2012/0122472 A1* | 5/2012 | Krishnamurthy | H04L 27/0012 455/456.1 |

(Continued)

FOREIGN PATENT DOCUMENTS

| | | |
|---|---|---|
| EP | 3480978 A1 | 5/2019 |
| WO | 2018237032 A1 | 12/2018 |
| WO | 2019022575 A1 | 1/2019 |

OTHER PUBLICATIONS

Huawei: "DL and UL Reference Signals for NR Positioning", 3GPP Draft, 3GPP TSG RAN WG1 Meeting #96bis, R1-1904004, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 2, 2019 (Apr. 2, 2019), XP051707080, 13 Pages, Retrieved from the Internet: URL: http://www.3gpp.org/ftp/tsg%5Fran/WG1%5FRL1/TSGR1%5F96b/Docs/R1%2D1904004%2Ezip, [retrieved on Apr. 2, 2019].

(Continued)

*Primary Examiner* — Kevin C. Harper
(74) *Attorney, Agent, or Firm* — Qualcomm Incorporated

(57) ABSTRACT

Disclosed are techniques for wireless communication. In an aspect, a method of wireless communication performed by a user equipment (UE) includes receiving, from a network entity, a plurality of positioning reference signal (PRS) configurations for one or more serving or neighboring transmission-reception points (TRPs), receiving, from the network entity, a set of parameters that indicate time and (Continued)

frequency locations of one or more synchronization signal blocks (SSBs) of the one or more serving or neighboring TRPs, and determining which PRS of the plurality of PRS configurations have been punctured by the one or more SSBs based on the set of parameters.

29 Claims, 19 Drawing Sheets

(52) U.S. Cl.
CPC ......... *H04W 72/042* (2013.01); *H04L 1/0013* (2013.01); *H04L 5/001* (2013.01); *H04L 5/0094* (2013.01)

(56) References Cited

U.S. PATENT DOCUMENTS

| | | | | |
|---|---|---|---|---|
| 2015/0201432 A1* | 7/2015 | Rong | ............... | H04L 5/0007 370/330 |
| 2018/0054792 A1 | 2/2018 | Lee et al. | | |
| 2018/0097596 A1* | 4/2018 | Palanivelu | ............ | H04L 5/0048 |
| 2018/0262308 A1* | 9/2018 | Si | ................. | H04L 5/0053 |
| 2018/0324022 A1 | 11/2018 | Sheng et al. | | |
| 2018/0337757 A1 | 11/2018 | Noh et al. | | |
| 2019/0074886 A1* | 3/2019 | Yoon | ............... | H04L 5/0091 |
| 2019/0149383 A1* | 5/2019 | Ko | ............... | H04L 27/2666 370/329 |
| 2019/0159180 A1 | 5/2019 | Ly et al. | | |
| 2019/0268819 A1* | 8/2019 | Kim | ................. | H04W 36/0085 |
| 2020/0015214 A1* | 1/2020 | Si | .............. | H04W 72/02 |
| 2020/0067755 A1* | 2/2020 | Pan | ................. | H04W 56/0015 |
| 2020/0068514 A1* | 2/2020 | Liu | ............... | H04L 5/00 |
| 2020/0280957 A1* | 9/2020 | Gao | ................. | H04L 5/0094 |
| 2020/0322905 A1* | 10/2020 | Guo | ................. | H04W 72/005 |
| 2021/0120519 A1* | 4/2021 | Si | ............... | H04B 7/0626 |
| 2022/0123879 A1* | 4/2022 | Munier | ............... | H04W 56/001 |

OTHER PUBLICATIONS

Huawei: et al., "DL RS Design for NR Positioning", 3GPP Draft, 3GPP TSG RAN WG1 #97, R1-1906052, 3rd Generation Partnership Project (3GPP), Mobile Competence Centre, 650, Route Des Lucioles, F-06921 Sophia-Antipolis Cedex, France, vol. RAN WG1, No. Reno. USA, May 13, 2019-May 17, 2019, May 13, 2019 (May 13, 2019), XP051727509, 7 pages, Retrieved from the Internet: URL: http://www.3gpp.org/ftp/Meetings%5F3GPP%5FSYNC/RAN1/Docs/R1%2D1906052%2Ezip. [retrieved on May 13, 2019] Section 2.6.

International Search Report and Written Opinion—PCT/US2020/046498—ISA/EPO—dated Nov. 18, 2020.

Intel Corporation: "Feature Lead Summary on AI 7.2.10.1—DL Reference Signals for NR Positioning", R1-1907761, 3GPP TSG RAN WG1 Meeting #97, Reno, USA, May 13-17, 2019, pp. 1-14.

* cited by examiner

```
ANSISTART
TAG-SERVING-CELL-CONFIG-COMMON-START

ServingCellConfigCommon ::=        SEQUENCE {
    physCellId                         physCellId
    downlinkConfigCommon               downlinkConfigCommon uplinkConfigCommon                 uplinkConfigCommon
    supplementaryuplinkConfig          uplinkConfigCommon
    n-TimingAdvanceOffest              ENUMERATED { n0, n25600, n39936 }
    sab-PositionsInBurat               CHOICE {
        shortBitmap                        BIT STRING (SIZE (4)),
        mediumBitmap                       BIT STRING (SIZE (8)),
        longBitmap                         BIT STRING (SIZE (64))
    }
    ssb-periodicityServingCell         ENUMERATED { ms5, ms10, ms20, ms40, ms80, ms160, spare2, spare1 }
    dmrs-TypeA,-Position               ENUMERATED {pos2, pos3},
    lte-CRS-ToMatchAround              SetupRelease { RatematchPatternLTE-CRS }
    rateMatchPatternToAddModList       SEQUENCE (SIZE (1..maxrofRateMatchPatterns)) OF RateMatchPattern
    rateMatchPatternToReleaseList      SEQUENCE (SIZE (1..maxrofRateMatchPatterns)) OF RateMatchPatternID
    subcarrierspacing                  SubcarrierSpacing
    tdd-UL-DL-ConfigurationCommon      TDD-UL-DL-ConfigCommon
```

INDICATION OF TIME-FREQUENCY SYNCHRONIZATION SIGNAL BLOCK (SSB) LOCATIONS OF NEIGHBORING TRANSMISSION-RECEPTION POINTS FOR POSITIONING REFERENCE SIGNAL PUNCTURING PURPOSES

CROSS-REFERENCE TO RELATED APPLICATIONS

The present application for patent claims the benefit of U.S. Provisional Application No. 62/887,595, entitled "INDICATION OF TIME-FREQUENCY SYNCHRONIZATION SIGNAL BLOCK (SSB) LOCATIONS OF NEIGHBORING TRANSMISSION-RECEPTION POINTS FOR POSITIONING REFERENCE SIGNAL PUNCTURING PURPOSES," filed Aug. 15, 2019, assigned to the assignee hereof, and expressly incorporated herein by reference in its entirety.

BACKGROUND OF THE DISCLOSURE

1. Field of the Disclosure

Aspects of the disclosure relate generally to wireless communications and the like.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) mobile standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving, from a network entity, a plurality of positioning reference signal (PRS) configurations for one or more serving or neighboring transmission-reception points (TRPs), receiving, from the network entity, a set of parameters that indicate time and frequency locations of one or more synchronization signal blocks (SSBs) of the one or more serving or neighboring TRPs, and determining which PRS of the plurality of PRS configurations have been punctured by the one or more SSBs based on the set of parameters.

In an aspect, a method of wireless communication performed by a network entity includes transmitting, to a UE, a plurality of PRS configurations for one or more serving or neighboring TRPs, and transmitting, to the UE, a set of parameters that indicate time and frequency locations of one or more SSBs of the one or more serving or neighboring TRPs.

In an aspect, a UE includes a memory, at least one transceiver, and at least one processor communicatively coupled to the memory and the at least one transceiver, the at least one processor configured to: receive, from a network entity via the at least one transceiver, a plurality of PRS configurations for one or more serving or neighboring TRPs, receive, from the network entity via the at least one transceiver, a set of parameters that indicate time and frequency locations of one or more SSBs of the one or more serving or neighboring TRPs, and determine which PRS of the plurality of PRS configurations have been punctured by the one or more SSBs based on the set of parameters.

In an aspect, a network entity includes a memory, a communication device, and at least one processor communicatively coupled to the memory and the communication device, the at least one processor configured to: cause the communication device to transmit, to a UE, a plurality of PRS configurations for one or more serving or neighboring TRPs, and cause the communication device to transmit, to the UE, a set of parameters that indicate time and frequency locations of one or more SSBs of the one or more serving or neighboring TRPs.

In an aspect, a UE includes means for receiving, from a network entity, a plurality of PRS configurations for one or more serving or neighboring TRPs, means for receiving, from the network entity, a set of parameters that indicate time and frequency locations of one or more SSBs of the one or more serving or neighboring TRPs, and means for determining which PRS of the plurality of PRS configurations have been punctured by the one or more SSBs based on the set of parameters.

In an aspect, a network entity includes means for transmitting, to a UE, a plurality of PRS configurations for one or more serving or neighboring TRPs, and means for transmitting, to the UE, a set of parameters that indicate time and frequency locations of one or more SSBs of the one or more serving or neighboring TRPs.

In an aspect, a non-transitory computer-readable medium storing computer-executable instructions includes computer-executable instructions comprising at least one instruction instructing a UE to receive, from a network entity, a plurality of PRS configurations for one or more serving or neighboring TRPs, at least one instruction instructing the UE to receive, from the network entity, a set of parameters that indicate time and frequency locations of one or more SSBs of the one or more serving or neighboring TRPs, and at least one instruction instructing the UE to determine which PRS of the plurality of PRS configurations have been punctured by the one or more SSBs based on the set of parameters.

In an aspect, a non-transitory computer-readable medium storing computer-executable instructions includes computer-executable instructions comprising at least one instruction instructing a network entity to transmit, to a UE, a plurality of positioning reference signal (PRS) configurations for one or more serving or neighboring TRPs, and at least one instruction instructing the network entity to transmit, to the UE, a set of parameters that indicate time and frequency locations of one or more SSBs of the one or more serving or neighboring TRPs.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
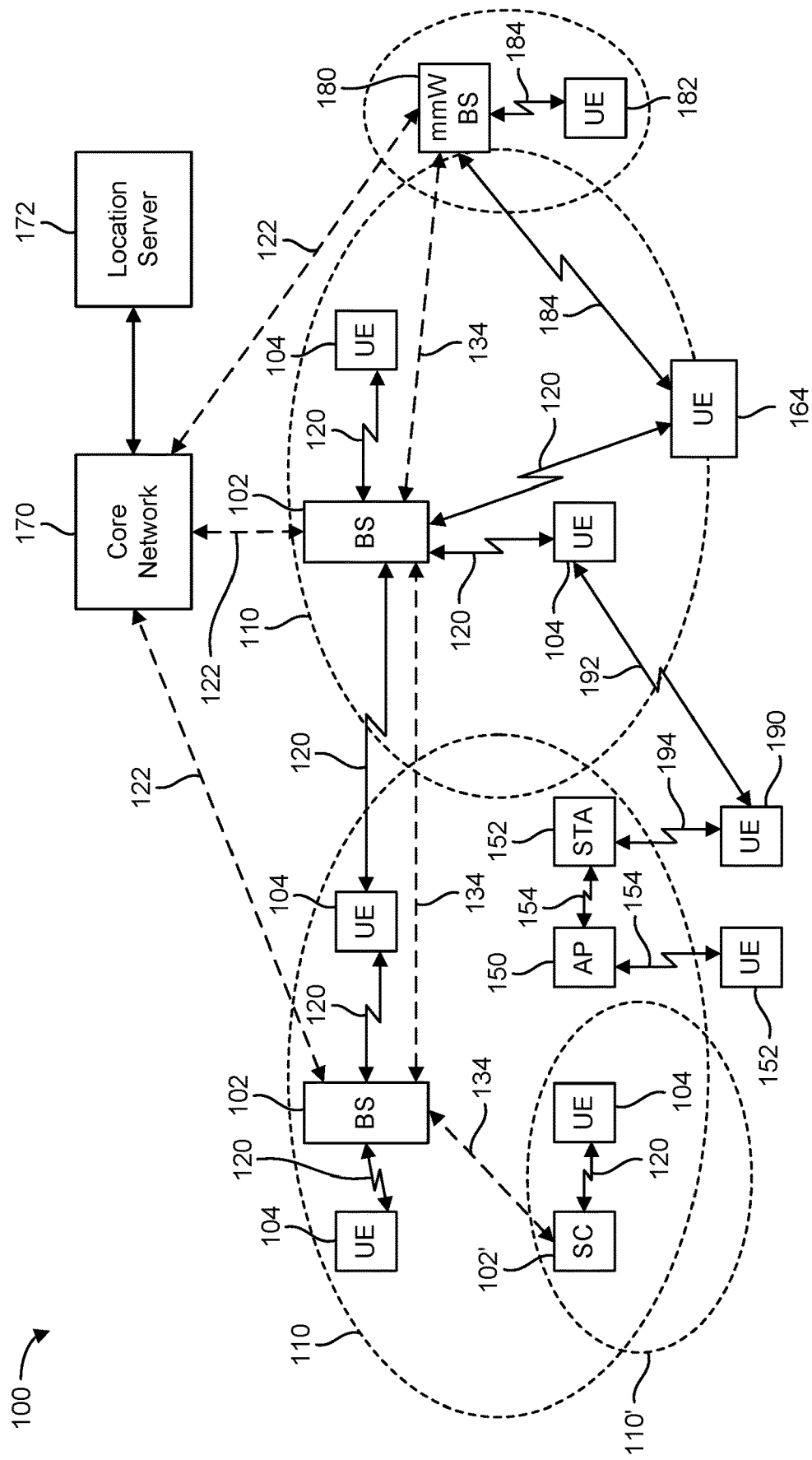
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations (BSs) 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to an NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While geographic coverage areas 110 of neighboring macro cell base station 102 may partially overlap (e.g., in a handover region), some of the geographic coverage areas 110 may be substantially overlapped by a larger geographic coverage area 110. For example, a small cell base station 102' (labeled "SC" in FIG. 1) may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have a high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

A receive beam may be spatially related to a transmit beam. A spatial relation means that parameters for a transmit beam for a second reference signal can be derived from information about a receive beam for a first reference signal. For example, a UE may use a particular receive beam to receive a reference downlink reference signal (e.g., SSB) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a secondary frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

Figure 2A:
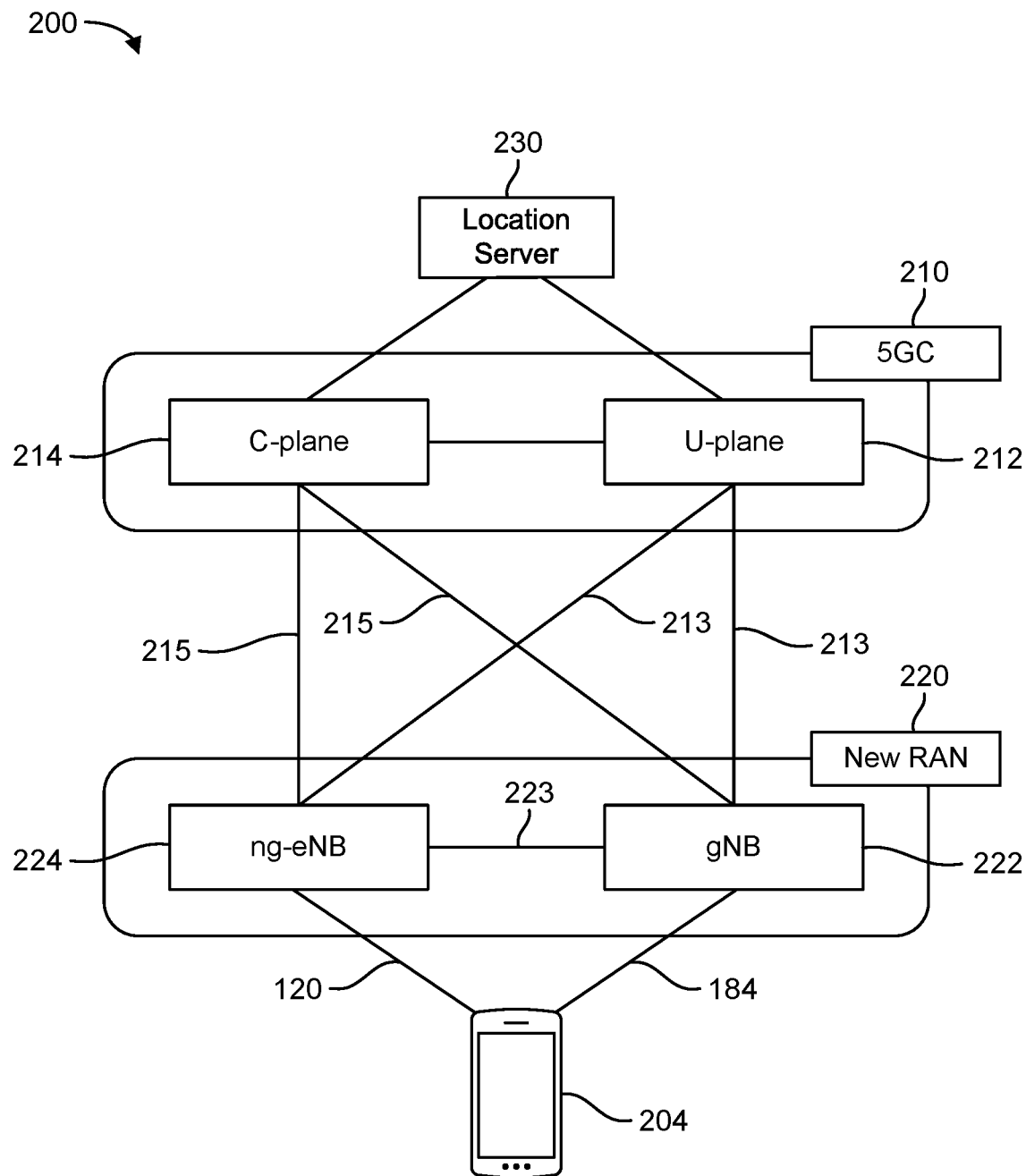
FIGS. 2A and 2B illustrate exemplary wireless network structures, according to various aspects of the disclosure.

According to various aspects, FIG. 2A illustrates an exemplary wireless network structure 200. For example, a 5GC 210 (also referred to as a Next Generation Core (NGC)) can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the 5GC 210 and specifically to the user plane functions 212 and the control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
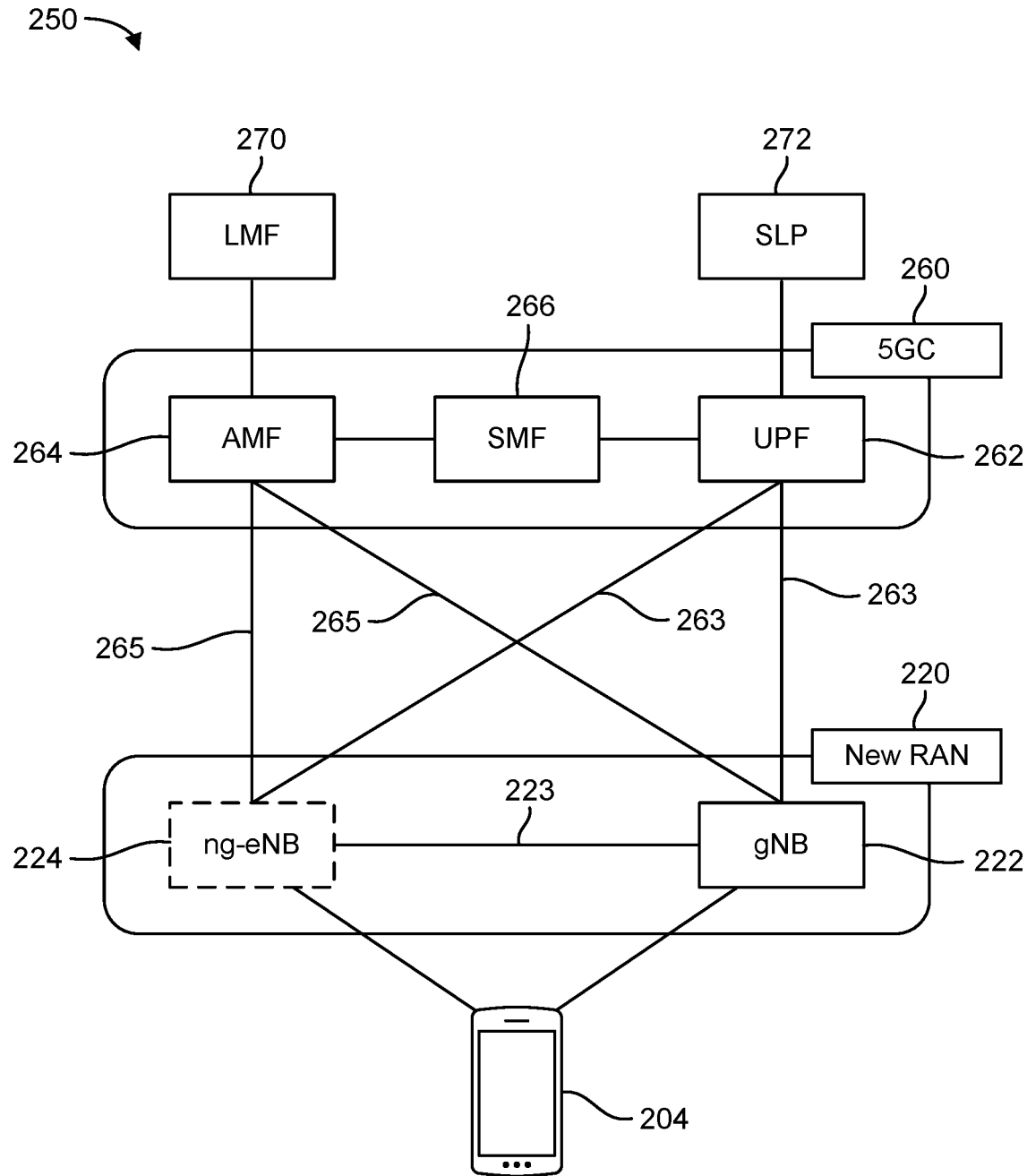

According to various aspects, FIG. 2B illustrates another exemplary wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
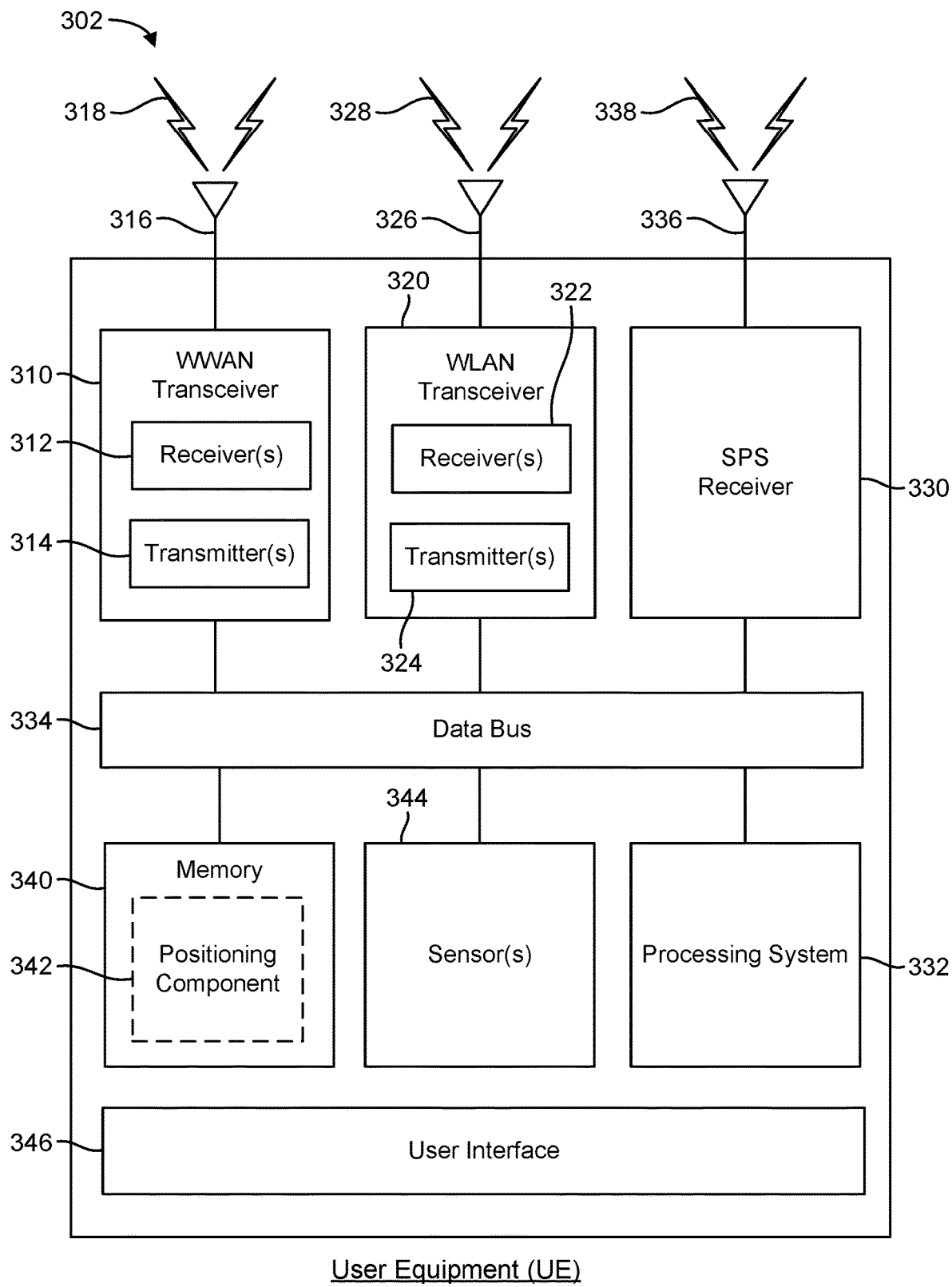
FIGS. 3A to 3C are simplified block diagrams of several exemplary aspects of components that may be employed in a UE, a base station, and a network entity, respectively, according to aspects of the disclosure.
Figure 3B:
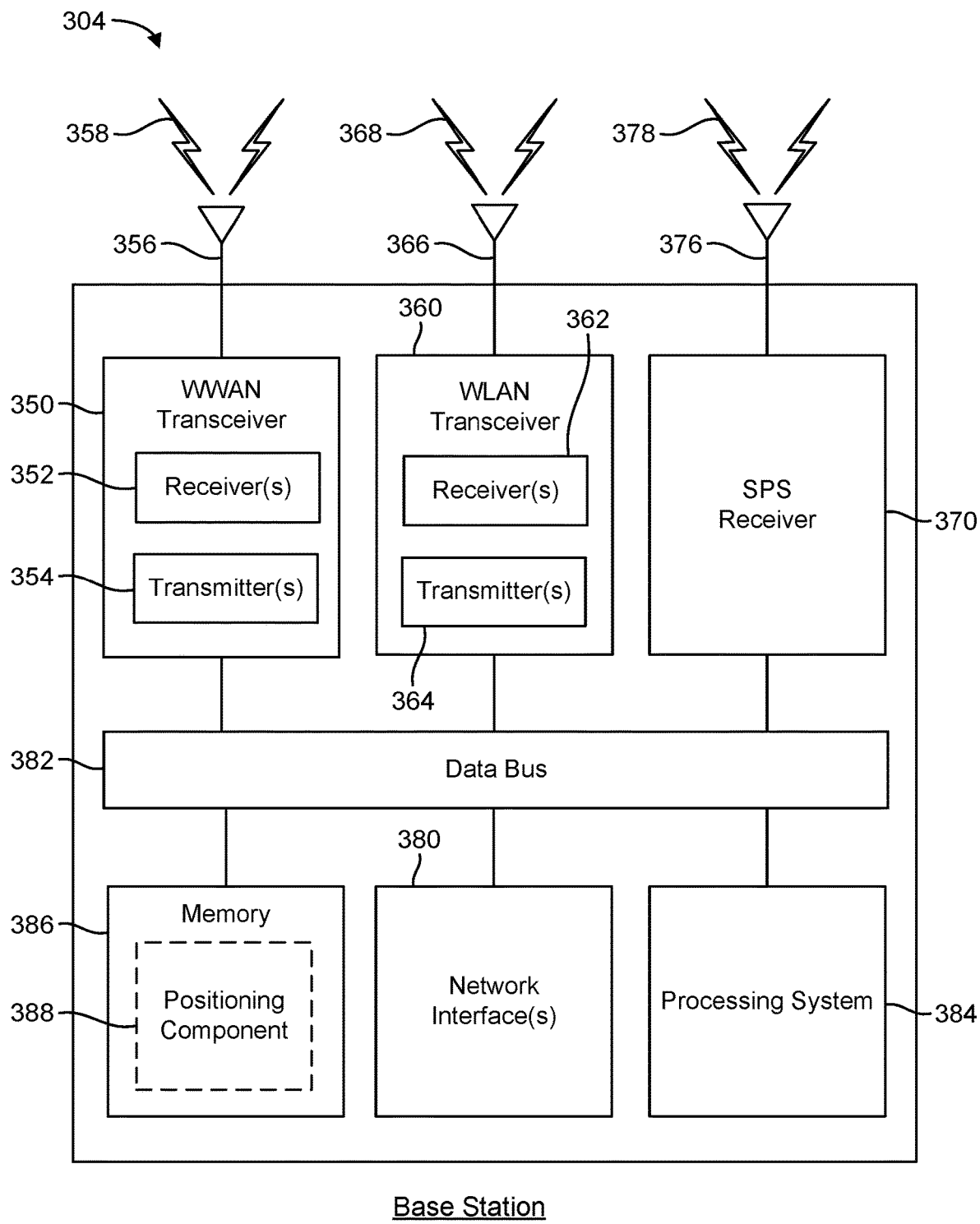
Figure 3C:
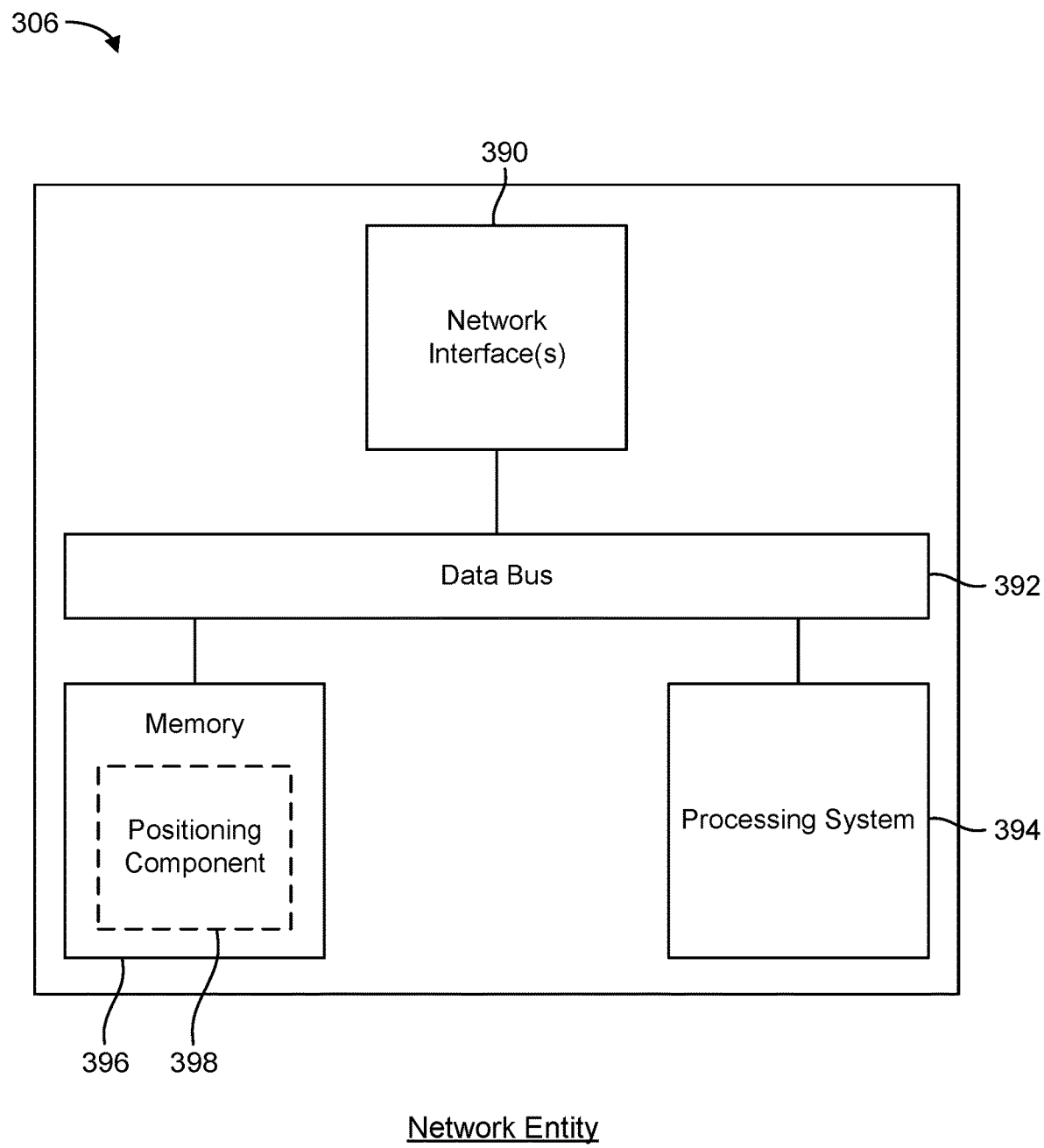

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320) of the UE 302 and/or a wireless communication device (e.g., one or both of the transceivers 350 and 360) of the base station 304 may also comprise a network listen module (NLM) or the like for performing various measurements.

The UE 302 and the base station 304 also include, at least in some cases, satellite positioning systems (SPS) receivers 330 and 370, respectively. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm, respectively.

The base station 304 and the network entity 306 each include one or more network interfaces 380 and 390, respectively, for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.), respectively. Alternatively, the positioning components 342, 388, and 398 may be memory modules (as shown in FIGS. 3A-3C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-3C may be implemented in various ways. In some implementations, the components of FIGS. 3A-3C may be implemented in one or more circuits such as, for example, one or more processors and/or one or more ASICs (which may include one or more processors).

Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

Figure 4A:
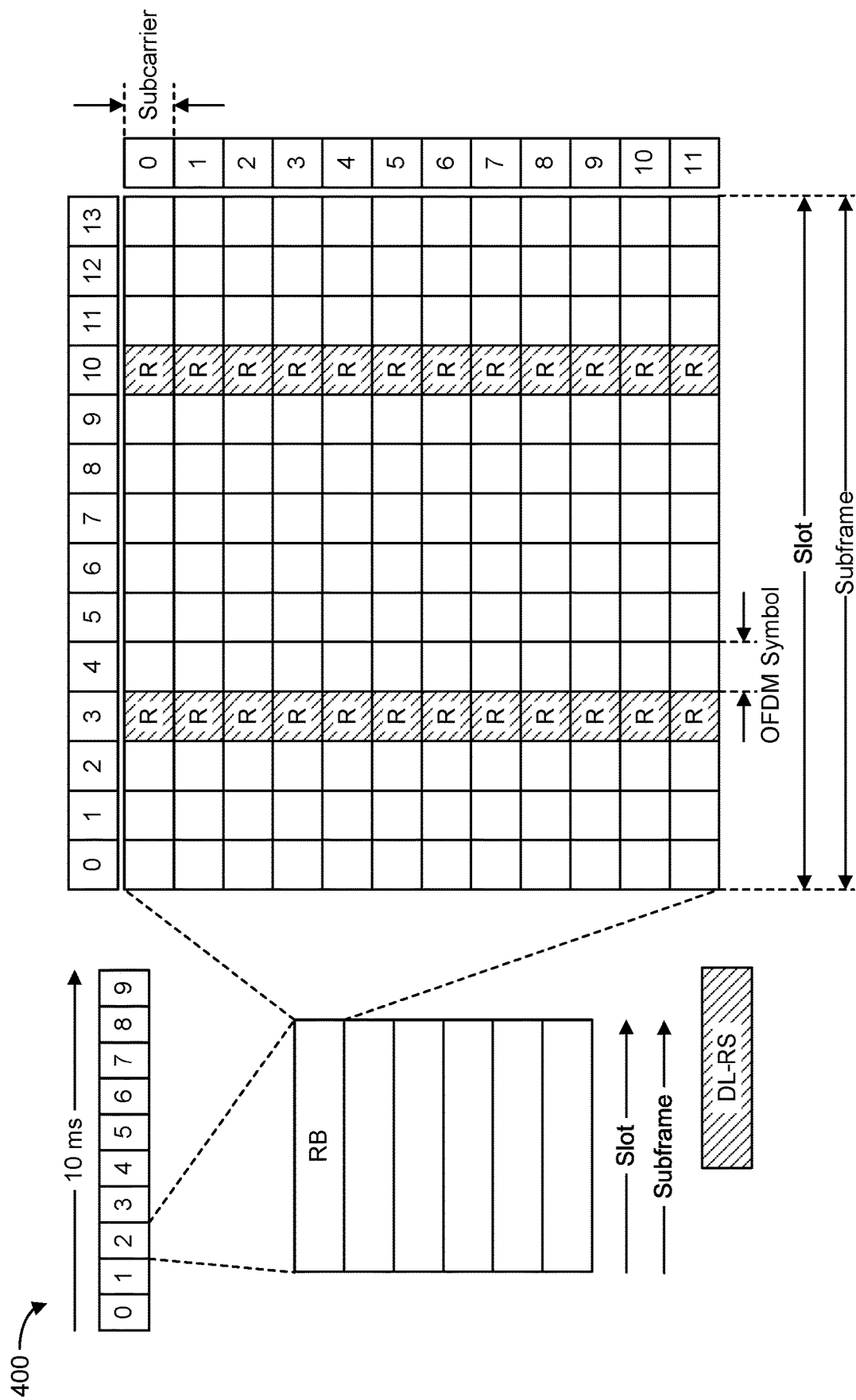
FIGS. 4A and 4B are diagrams illustrating exemplary frame structures and channels within the frame structures, according to aspects of the disclosure.
Figure 4B:
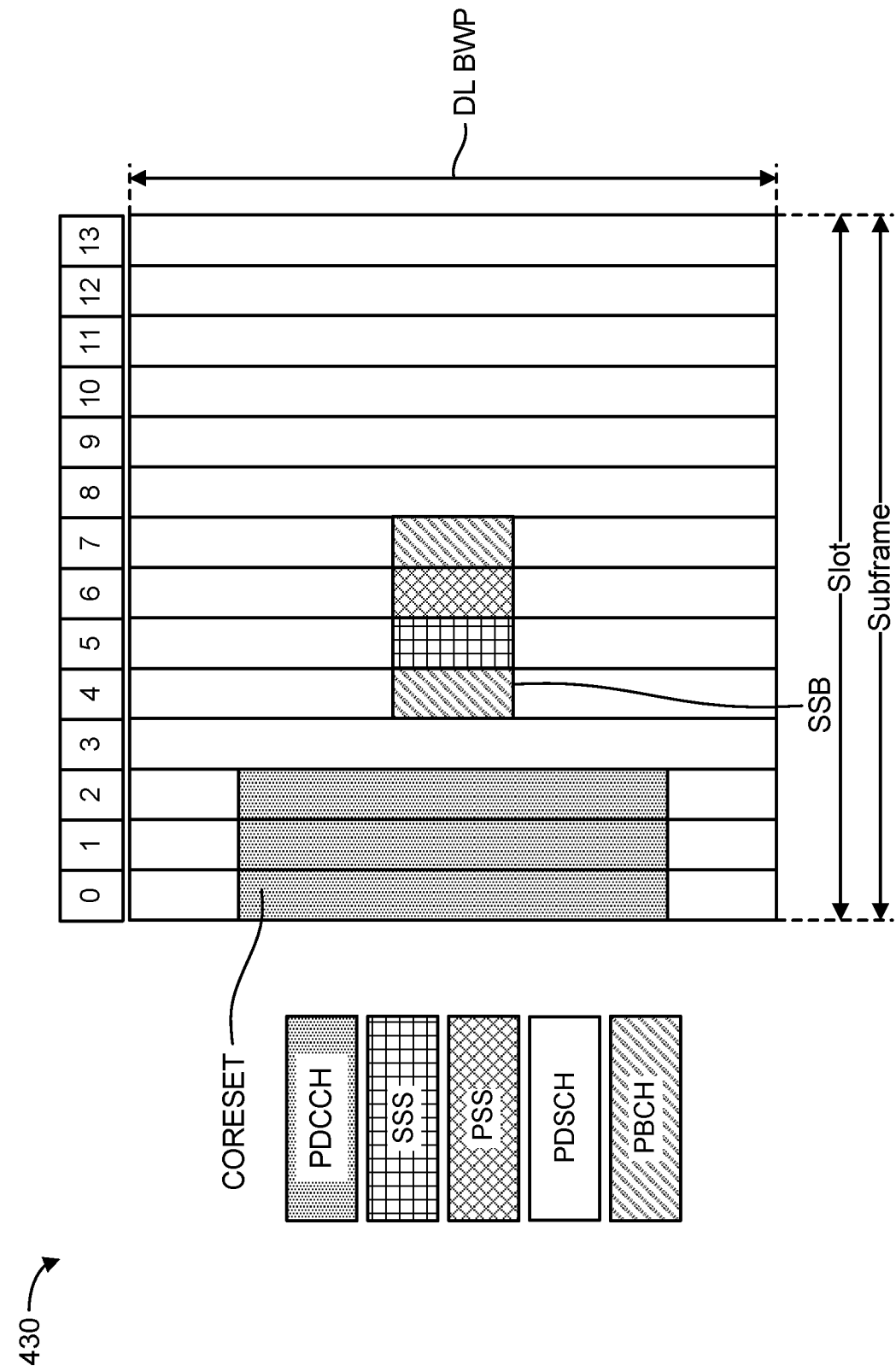

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (μ), for example, subcarrier spacing of 15 kHz, 30 kHz, 60 kHz, 120 kHz and 240 kHz or greater may be available. Table 1 provided below lists some various parameters for different NR numerologies.

TABLE 1

| μ | Subcarrier spacing (kHz) | Symbols/ Slot | Slots/ Subframe | Slots/ Frame | Slot Duration (ms) | Symbol Duration (μs) | Max. nominal system bandwidth (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the examples of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

As illustrated in FIG. 4A, some of the REs carry downlink reference (pilot) signals (DL-RS) for channel estimation at the UE. The DL-RS may include demodulation reference signals (DMRS), channel state information reference signals (CSI-RS), cell-specific reference signals (CRS), positioning reference signals (PRS), navigation reference signals (NRS), tracking reference signals (TRS), etc., exemplary locations of which are labeled "R" in FIG. 4A.

A collection of resource elements (REs) that are used for transmission of PRS is referred to as a "PRS resource." The collection of resource elements can span multiple PRBs in the frequency domain and N (e.g., 1 or more) consecutive symbol(s) within a slot in the time domain. In a given OFDM symbol in the time domain, a PRS resource occupies consecutive PRBs in the frequency domain.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set have the same periodicity, a common muting pattern configuration, and the same repetition factor across slots. The periodicity may have a length of $2^\mu$-t slots, with t selected from a set of {4, 5, 8, 10, 16, 20, 32, 40, 64, 80, 160, 320, 640, 1280, 2560, 5120, 10240}, and $\mu$=0, 1, 2, or 3. The repetition factor may have a length of n slots, with n selected from a set of {1, 2, 4, 6, 8, 16, 32}.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance," a "positioning occasion," a "positioning instance," or simply an "occasion" or "instance."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, NRS in 5G, TRS, CRS, CSI-RS, DMRS, primary synchronization signal (PSS), secondary synchronization signal (SSS), SSB, etc.

FIG. 4B illustrates an example of various channels within a downlink slot of a radio frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning that the UE may only receive or transmit over one BWP at a time. On the downlink, the bandwidth of each BWP should be equal to or greater than the bandwidth of the SSB, but it may or may not contain the SSB.

Referring to FIG. 4B, a PSS is used by a UE to determine subframe/symbol timing and a physical layer identity. An SSS is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form a synchronization signal (SS)/PBCH block (also referred to as an SSB in NR, and referred to interchangeably herein as an SS/PBCH block, an SS block, or an SSB). The SS/PBCH block is used for, among other things, initial cell search, beam and cell measurements (e.g., radio resource management (RRM)), radio link monitoring, and new beam identification in beam recovery procedures. The MIB provides a number of RBs in the downlink system bandwidth and a system frame number (SFN). The physical downlink shared channel (PDSCH) is the main data bearing channel, which is allocated to users on a dynamic and opportunistic basis, and carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Mobile network operators show great interest in dynamic spectrum sharing (DSS) between NR and LTE radio access technologies. Without DSS, an operator would have to split its available spectrum into two portions, a portion for LTE and a portion for NR. With DSS, however, an operator can use all its available spectrum for both NR and LTE by intelligently allocating between NR and LTE carriers operating in the same frequency band (e.g., 20 MHz), depending on the traffic requirements and user needs.

To implement DSS, it is expected that legacy LTE networks will be able to operate without modification, whereas NR network nodes are expected to perform rate matching to occupy the resources in the LTE frequency band(s) that are not occupied by LTE traffic. Currently, both RB-level and RE-level rate matching with LTE resources are supported in NR for 15 KHz subcarrier spacing (SCS). At the RE level, the NR PDSCH can be transmitted in the REs of the LTE CRS symbols if RRC information element (IE) "lte-CRS-ToMatchAround" is enabled. That is, NR PDSCH traffic can be rate-matched to fit on the remaining subcarriers of the LTE CRS symbols, thereby increasing throughput for NR users without impacting legacy LTE users. For downlink scheduling, in the slot shared between LTE and NR traffic, to avoid conflict with the LTE PDCCH, the NR traffic starts from the second symbol of the slot and only type B scheduling is used.

Figure 5:
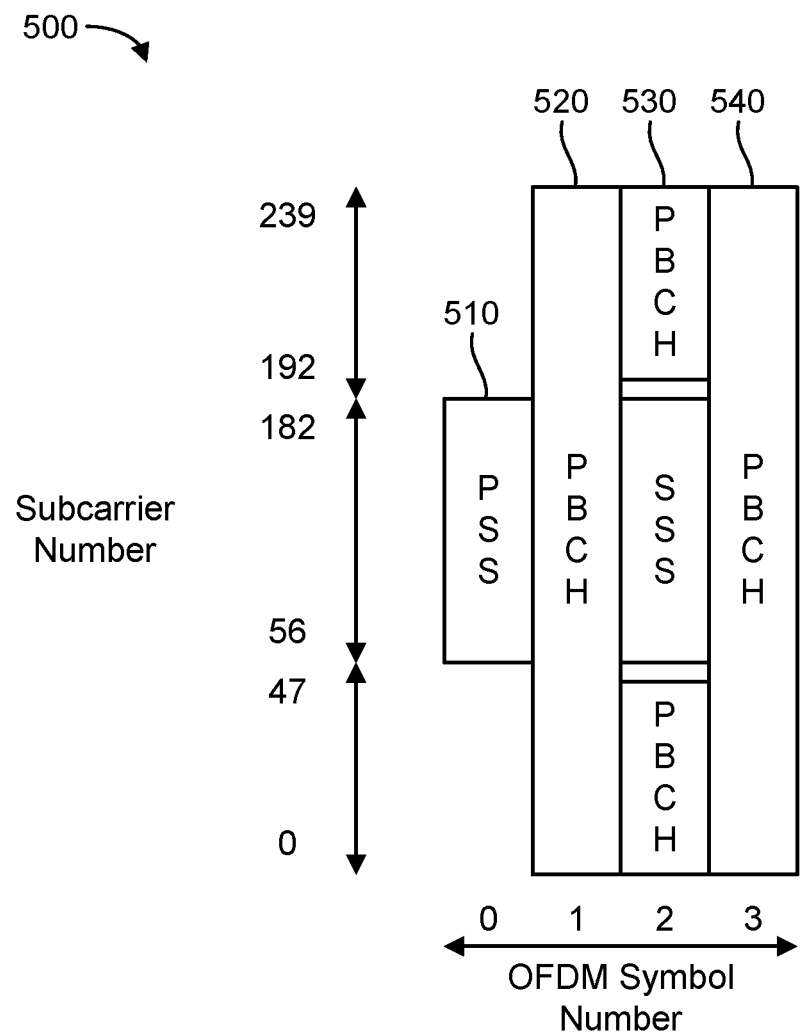
FIG. 5 is a diagram illustrating an example of an SSB according to an aspect of the disclosure.

There are various issues that need to be addressed to implement DSS between NR and LTE. One issue is that the SS/PBCH block (which may also be referred to in NR as the SSB) occupies four consecutive symbols in the time domain and 20 consecutive RBs in the frequency domain, as shown in FIG. 5. FIG. 5 illustrates a configuration of an SS/PBCH block 500, according to aspects of the disclosure. As illustrated in FIG. 5, a configuration of the SS/PBCH block 500 (or SSB) comprises four OFDM symbols 510-540 in the time domain, the first spanning 12 RBs in the frequency domain and the remaining three spanning 20 RBs. The first symbol 510 carries the PSS, the second symbol 520 carries a PBCH, the third symbol 530 carries an SSS, and the fourth symbol 540 carries another PBCH. PBCH RBs also fill up the remaining RBs of the third symbol 530 carrying the SSS, minus some guard subcarriers, as shown by the gaps between the PBCH RBs and the SSS in symbol 530.

The PSS and SSS in the first and third symbols 510 and 530, respectively, comprise 12 RBs each, and there is a total of 48 PBCH RBs. As described above with reference to FIGS. 4A and 4B, each RB comprises 12 subcarriers, hence, 12 RBs comprise 144 subcarriers and 20 RBs comprise 240 subcarriers. As such, the PBCH in symbols 520 and 540 span 240 subcarriers, and the PSS and SSS in the first and third symbols 510 and 530 each comprise 127 subcarriers (144 subcarriers minus some guard subcarriers). Although not illustrated, the second and fourth symbols 520 and 540 carrying the PBCH include the PBCH DMRS and the PBCH data. The 20 RBs of each PBCH have a comb-3 DMRS (i.e., a DMRS is transmitted on every third subcarrier). The PSS, SSS, and PBCH are present in every SSB.

In NR, the SCS is 15 and 30 kHz for sub-6 GHz frequencies (i.e., FR1), and 120 or 240 kHz for frequencies above sub-6 GHz. The transmission of SSBs within an SS burst set is confined to a 5 ms window, regardless of SS burst set periodicity. Within this 5 ms window, the maximum number of possible candidate SSB locations is L (which defines beam sweeping for an SSB). The burst-set may have a periodicity of 5, 10, 20, 40, 80, or 160 ms, and L=4 at frequencies below 3 GHz, L=8 at frequencies between 3 and 6 GHz, and L=64 at frequencies between 6 and 52.6 GHz. The possible time-locations of the L SSBs within slots are specified in the applicable standard. There is a 6-bit indication in the remaining minimum system information (RMSI, also referred to as SIB1), and a full-bitmap (L-bit) in the dedicated RRC signaling, that can convey which of the L possible SSB locations are actually transmitted.

Figure 6A:
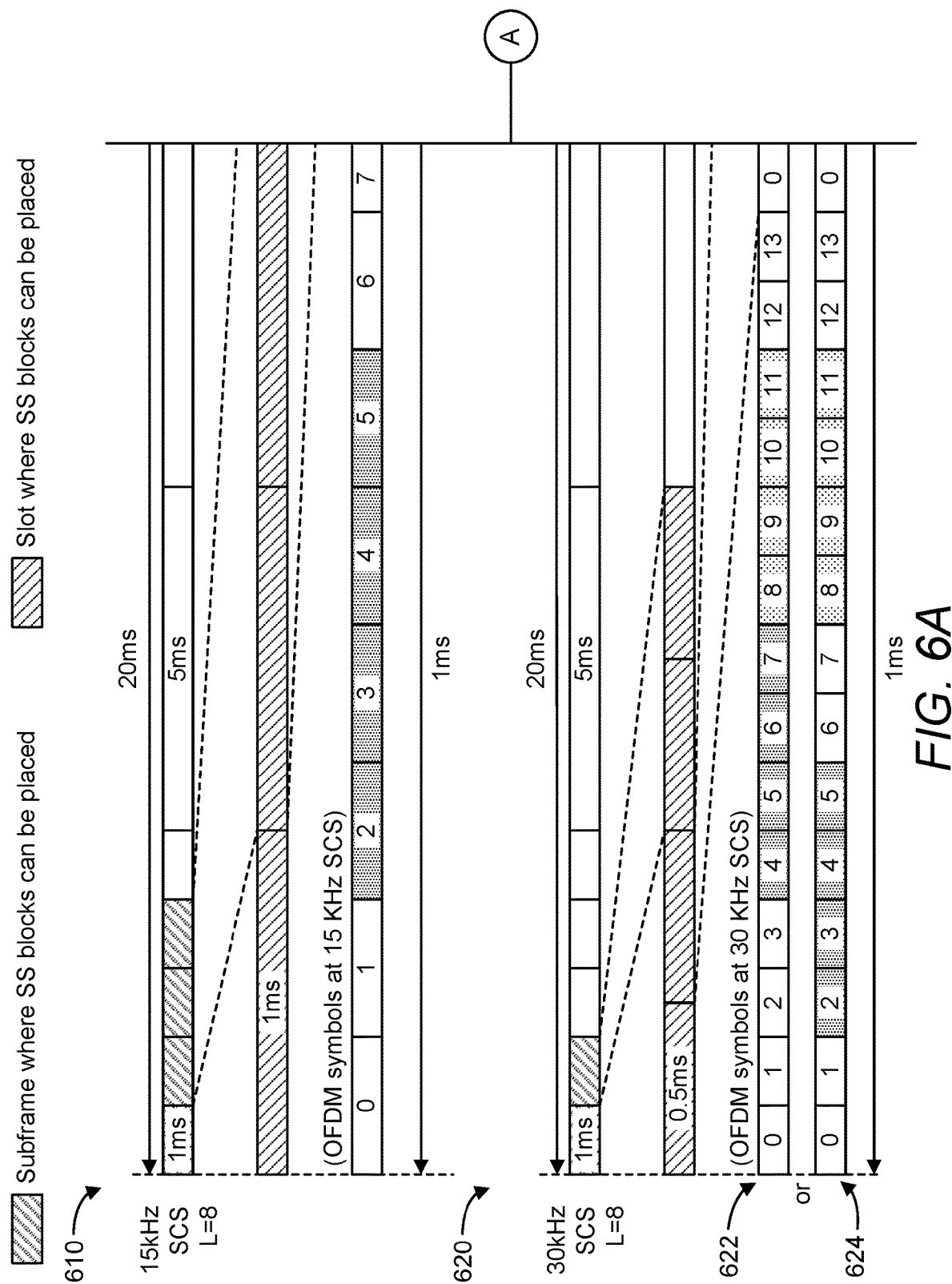
FIGS. 6A and 6B illustrate SSB locations within a half-frame for different subcarrier spacings, according to aspects of the disclosure.
Figure 6A:
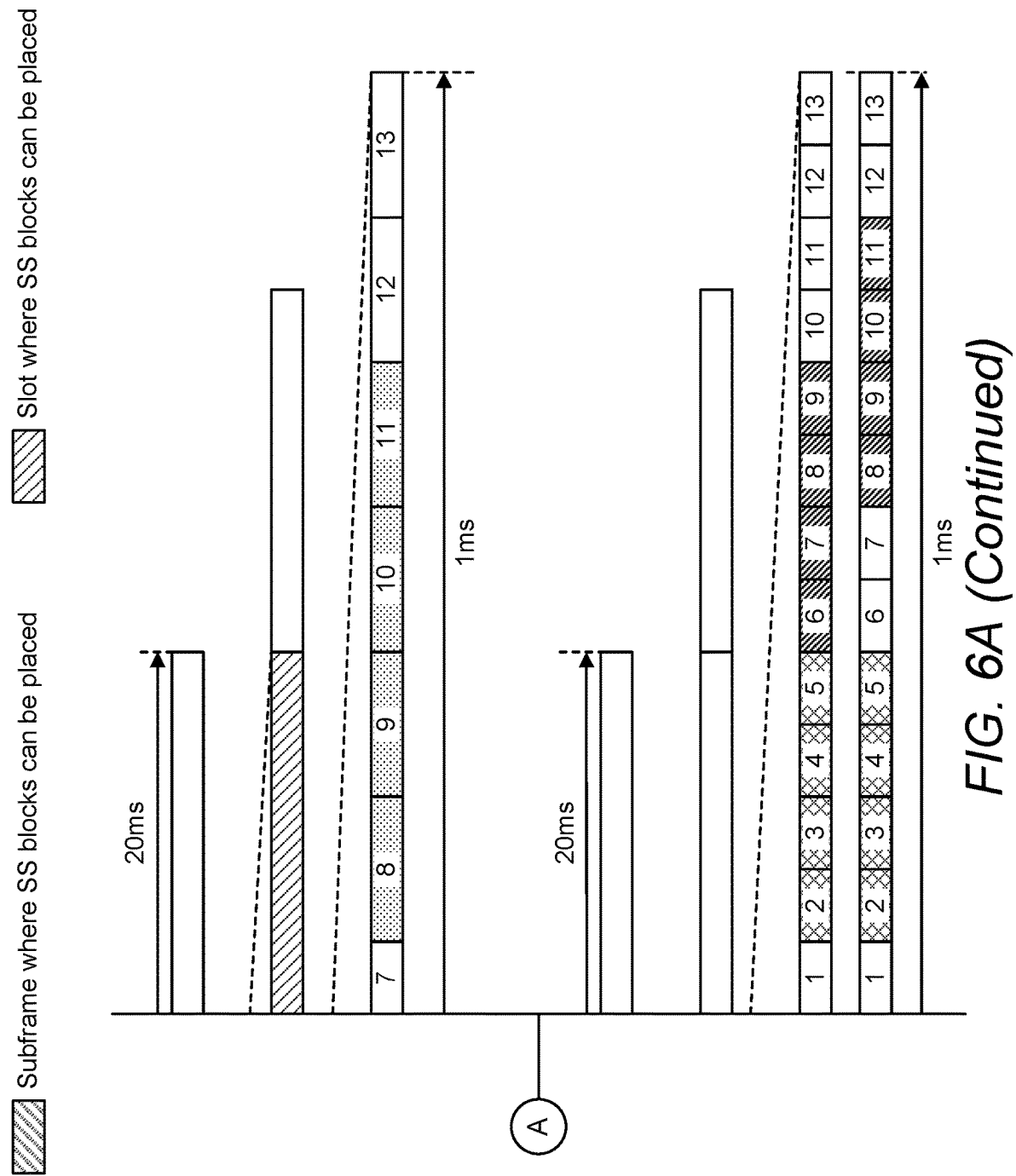

FIG. 6A illustrates SSB locations in the time domain within a 5 ms half-frame for SS with 15 kHz and 30 kHz SCS, according to aspects of the disclosure. In FIG. 6A, the maximum possible values of L are shown for every SCS. For 15 KHz SCS, illustrated by timeline 610, the two possible locations of an SSB are in OFDM symbols 2 to 5 and 8 to 11. For 30 KHz SCS, illustrated by timeline 620, there are four possible locations for SSBs in each of two different mapping options. In a first mapping option 622, the four possible SSB locations are OFDM symbols 4 to 7 and 8 to 11 in a first slot, and OFDM symbols 2 to 5 and 6 to 9 in a second slot. In the second mapping option 624, the four possible SSB locations are OFDM symbols 2 to 5 and 8 to 11 in a first slot, and OFDM symbols 2 to 5 and 8 to 11 in a second slot. In the example of FIG. 6A, for the serving cell (referred to interchangeably as a serving TRP), a UE knows that every 20 ms there will be an SSB, and based on specification, can find the SSBs.

Figure 6B:
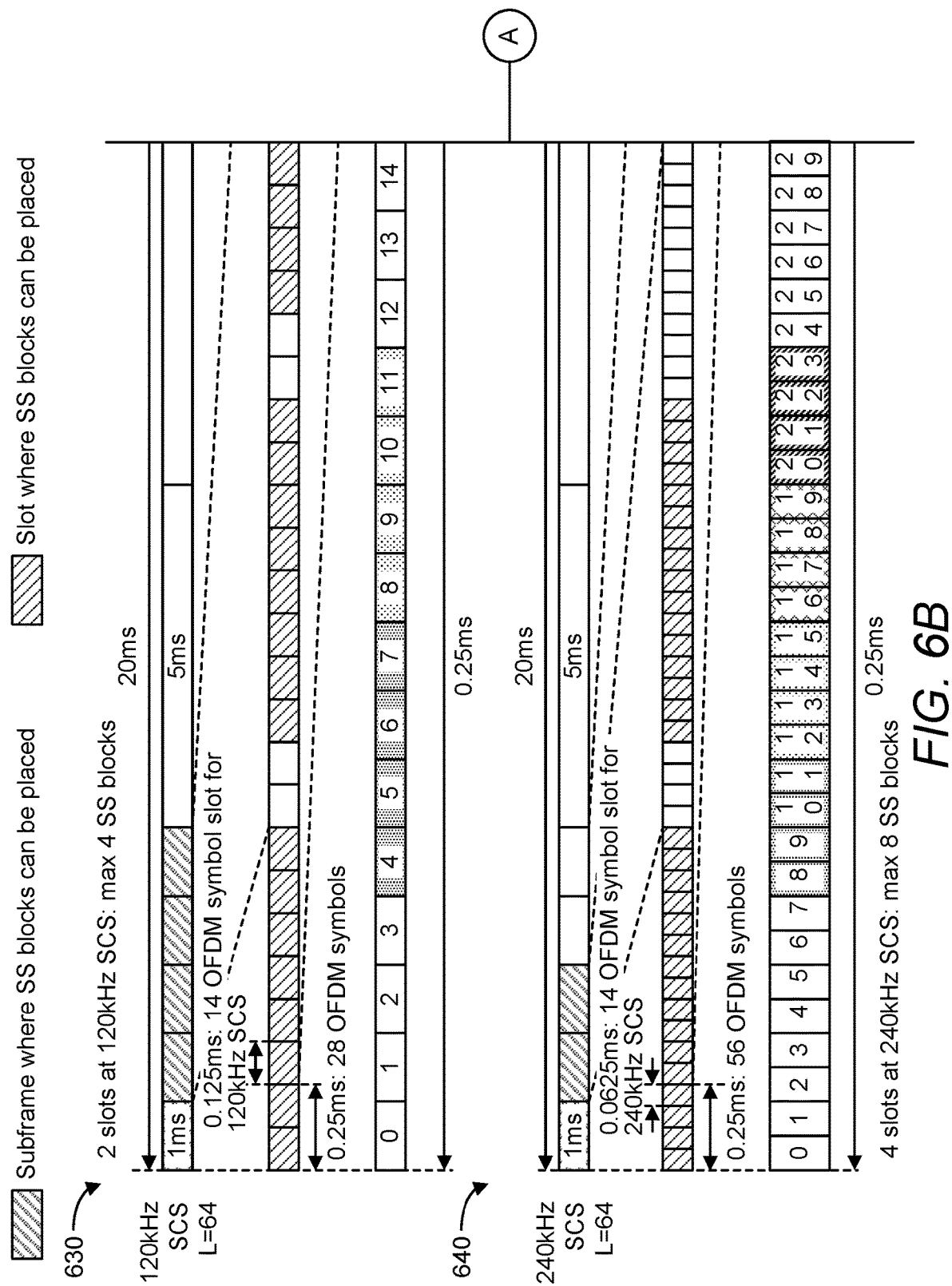
Figure 6B:
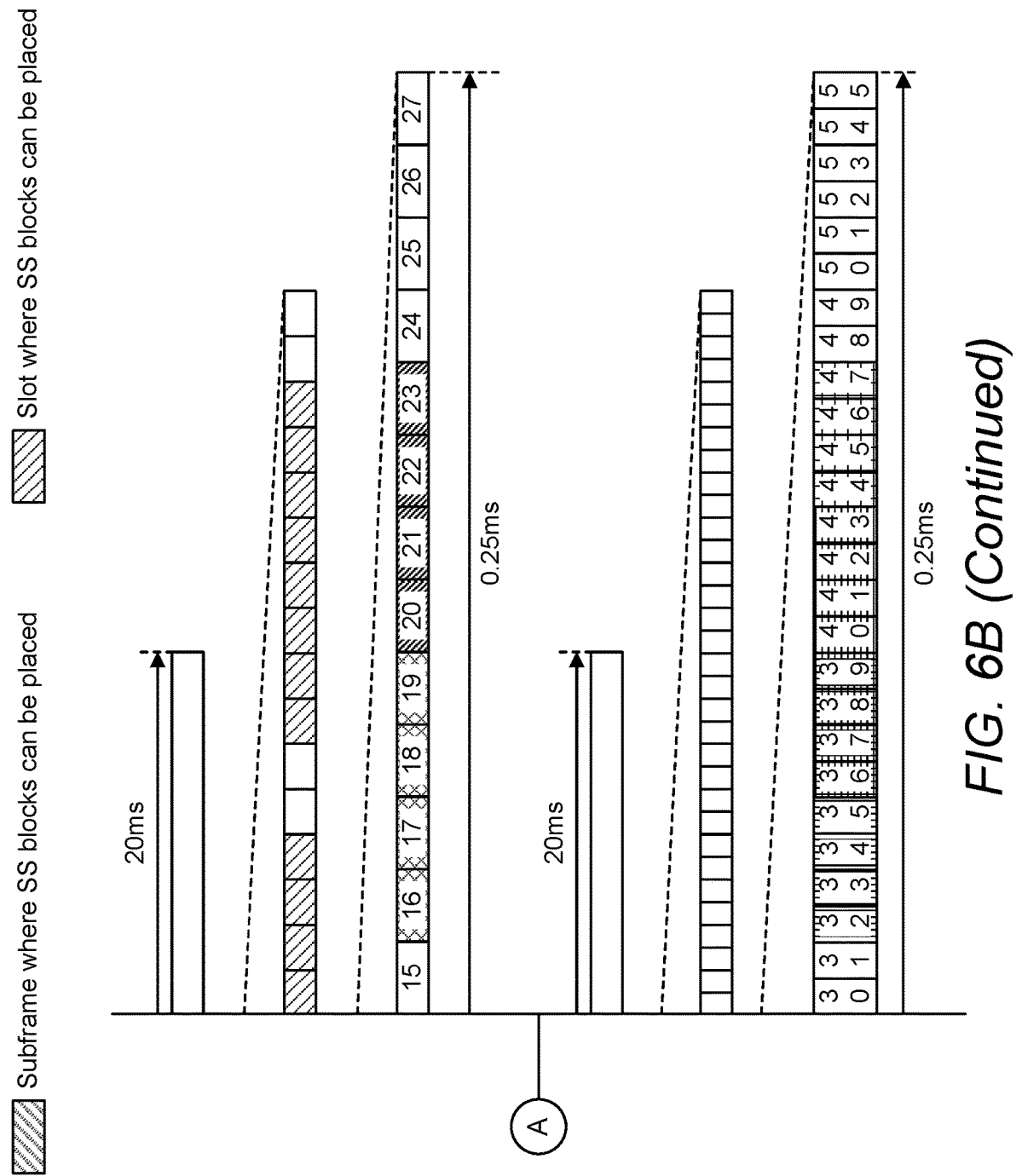

FIG. 6B illustrates SSB locations in the time domain within a 5 ms half-frame for SS with 120 kHz and 240 kHz SCS, according to aspects of the disclosure. Again, in FIG. 6B, the maximum possible values of L are shown for every SCS. For 120 KHz SCS, illustrated by timeline 630, the four possible locations of an SSB are at OFDM symbols 4 to 7, 8 to 11, 16 to 19, and 20 to 23. For 240 KHz SCS, illustrated by timeline 640, there are eight possible locations for SSBs: 8 to 11, 12 to 15, 16 to 19, 20 to 23, 32 to 35, 36 to 39, 40 to 43, and 44 to 47.

For a half frame with SS/PBCH blocks (e.g., SS/PBCH block 500), the first symbol indexes for candidate SS/PBCH blocks are determined according to the SCS of SS/PBCH blocks as follows, where index 0 corresponds to the first symbol of the first slot in a half-frame.

Case A—15 kHz SCS: the first symbols of the candidate SS/PBCH blocks (SSBs) have indexes of $\{2, 8\}+14 \times n$. For carrier frequencies less than or equal to 3 GHz, n is selected from the set $\{0, 1\}$. For carrier frequencies within FR1 greater than 3 GHz, n is selected from the set $\{0, 1, 2, 3\}$.

Case B—30 kHz SCS: the first symbols of the candidate SS/PBCH blocks (SSBs) have indexes $\{4, 8, 16, 20\}+28 \times n$. For carrier frequencies less than or equal to 3 GHz, n=0. For carrier frequencies within FR1 greater than 3 GHz, n is selected from the set $\{0, 1\}$.

Case C—30 kHz SCS: the first symbols of the candidate SS/PBCH blocks (SSBs) have indexes $\{2, 8\}+14 \times n$. For paired spectrum operation, for carrier frequencies less than or equal to 3 GHz, n is selected from the set $\{0, 1\}$. For carrier frequencies within FR1 greater than 3 GHz, n is selected from the set $\{0, 1, 2, 3\}$. For unpaired spectrum operation, for carrier frequencies less than or equal to 2.4 GHz, n is selected from the set $\{0, 1\}$. For carrier frequencies within FR1 greater than 2.4 GHz, n is selected from the set $\{0, 1, 2, 3\}$.

Case D—120 kHz SCS: the first symbols of the candidate SS/PBCH blocks (SSBs) have indexes $\{4, 8, 16, 20\}+28 \times n$. For carrier frequencies within FR2, n is selected from the set $\{0, 1, 2, 3, 5, 6, 7, 8, 10, 11, 12, 13, 15, 16, 17, 18\}$.

Case E—240 kHz SCS: the first symbols of the candidate SS/PBCH blocks have indexes $\{8, 12, 16, 20, 32, 36, 40, 44\}+56 \times n$. For carrier frequencies within FR2, n is selected from the set $\{0, 1, 2, 3, 5, 6, 7, 8\}$.

Figure 7:
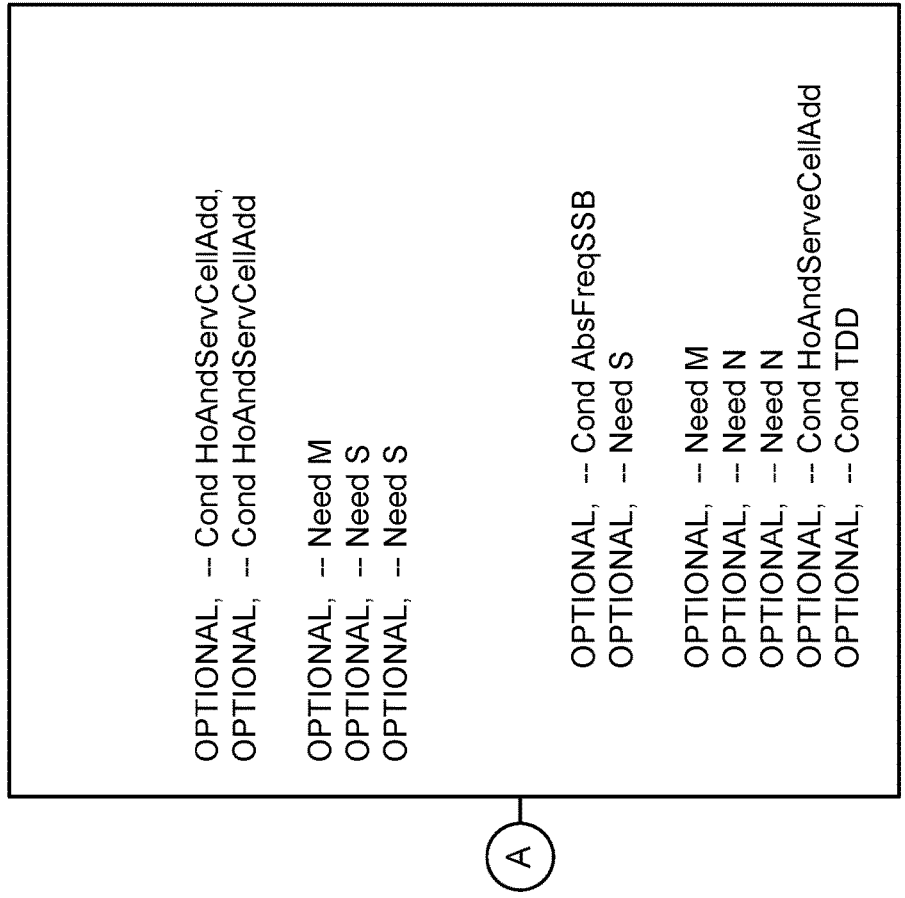
FIG. 7 illustrates an exemplary ServingCellConfigCommon information element (IE), according to aspects of the disclosure.

A UE needs to know not just in which frame(s) SSBs may appear, but also, the periodicity of the SSBs, and which of the possible SSB locations are actually carrying SSBs. This information is conveyed in the ServingCellConfigCommon IE. The ServingCellConfigCommon IE is used to configure cell-specific parameters of a UE's serving cell. The IE contains parameters that a UE would typically acquire from SSB(s), MIB(s), or SIB(s) when accessing a cell from the RRC IDLE state. With this IE, the network provides these parameters in dedicated signaling when configuring a UE with SCells or with an additional cell group (SCG). It also provides it for SpCells (master cell group (MCG) and secondary cell group (SCG)) upon reconfiguration with synchronization. FIG. 7 illustrates an exemplary ServingCellConfigCommon IE 700, according to aspects of the disclosure.

In NR, the SSB locations across different cells may appear on different time and/or frequency resources, and even multiple SSBs can exist on the same carrier. In addition, where a cell (or TRP) transmits both SSBs and PRS, the SSBs and PRS may be scheduled to be transmitted at the same time. Because an SSB has a higher priority than a PRS, a PRS overlapped by an SSB is "punctured" by the SSB. As such, a UE needs to know where the SSBs are transmitted so that it does not attempt to measure PRS at those time and frequency locations. However, a UE cannot detect the SSBs of neighboring cells (referred to interchangeably as neighboring TRPs) as it does for the SSBs of the serving cell. Thus, it would be beneficial for the UE to know the time and frequency locations of SSBs for neighboring cells so that the UE is aware of if and how the corresponding PRS from those cells are punctured.

"Puncturing" is a technique whereby, in the case of an overlap between a higher priority signal (here, the SSB) and a lower priority signal (here, PRS), the higher priority signal takes precedent, and the lower priority signal is not transmitted (i.e., "punctured") to allow the higher priority signal to use the resources otherwise allocated to the lower priority signal. More specifically, a subset of the set of resources (e.g., OFDM symbols) allocated to the lower priority signal is punctured, and the punctured subset of the set of resources is used for the higher priority signal. In that way, the higher priority signal is transmitted as if there were no overlap with the lower priority signal. The remaining non-punctured subset of the set of resources is used for the lower priority signal.

Figure 8:
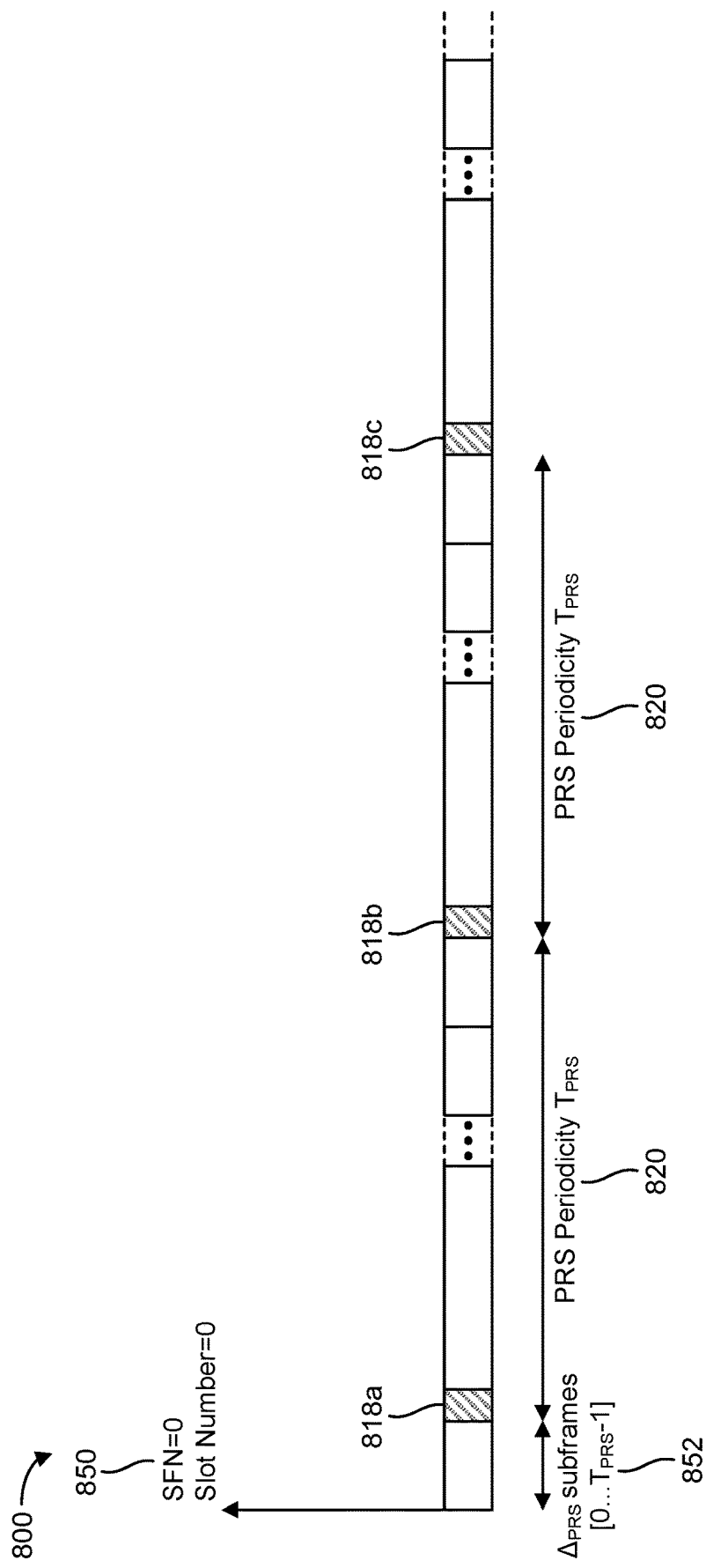
FIG. 8 illustrates an exemplary positioning reference signal (PRS) configuration for a cell supported by a base station.

FIG. 8 illustrates an exemplary PRS configuration 800 for a cell supported by a base station (or more specifically, a TRP of a base station). FIG. 8 shows how PRS positioning occasions are determined by an SFN, a cell-specific subframe offset ($\Delta_{PRS}$) 852, and a PRS periodicity ($T_{PRS}$) 820. Typically, the cell-specific PRS subframe configuration is defined by a PRS configuration index ($I_{PRS}$) included in positioning assistance data. The PRS periodicity ($T_{PRS}$) 820 and the cell-specific subframe offset ($\Delta_{PRS}$) are defined based on the PRS configuration index ($I_{PRS}$), as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$ – 160 |
| 480-1119 | 640 | $I_{PRS}$ – 480 |
| 1120-2399 | 1280 | $I_{PRS}$ – 1120 |
| 2400-2404 | 5 | $I_{PRS}$ – 2400 |
| 2405-2414 | 10 | $I_{PRS}$ – 2405 |
| 2415-2434 | 20 | $I_{PRS}$ – 2415 |
| 2435-2474 | 40 | $I_{PRS}$ – 2435 |
| 2475-2554 | 80 | $I_{PRS}$ – 2475 |
| 2555-4095 | Reserved | |

A PRS configuration is defined with reference to the SFN of the cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \le n_f \le 1023$, $n_s$ is the slot number within the radio frame defined by $n_f$ with $0 \le n_s \le 19$, $T_{PRS}$ is the PRS periodicity 820, and $\Delta_{PRS}$ is the cell-specific subframe offset 852.

As shown in FIG. 8, the cell-specific subframe offset 852 may be defined in terms of the number of subframes transmitted starting from SFN 0 ("Slot number=0," marked as slot 850) to the start of the first (subsequent) PRS positioning occasion. In the example in FIG. 8, the number of consecutive positioning subframes ($N_{PRS}$) in each of the consecutive PRS positioning occasions 818a, 818b, and 818c equals 4. Note that while $N_{PRS}$ may specify the number of consecutive positioning subframes per occasion, it may instead specify the number of consecutive positioning slots, based on implementation. For example, in LTE, $N_{PRS}$ specifies the number of consecutive positioning subframes per occasion, whereas in NR, $N_{PRS}$ specifies the number of consecutive positioning slots per occasion.

In some aspects, when a UE receives a PRS configuration index $I_{PRS}$ in the assistance data for a particular cell, the UE may determine the PRS periodicity $T_{PRS}$ 820 and PRS subframe offset $\Delta_{PRS}$ using Table 2. The UE may then determine the radio frame, subframe, and slot when a PRS is scheduled in the cell (e.g., using the equation above). The assistance data may be determined by, for example, the location server, and includes assistance data for a reference cell, and a number of neighbor cells supported by various base stations.

Typically, PRS occasions from all cells in a network that use the same frequency are aligned in time and may have a fixed known time offset (e.g., cell-specific subframe offset 852) relative to other cells in the network that use a different frequency. In SFN-synchronous networks all wireless nodes (e.g., base stations) may be aligned on both frame boundary and system frame number. Therefore, in SFN-synchronous networks, all cells supported by the various base stations may use the same PRS configuration index for any particular frequency of PRS transmission. On the other hand, in SFN-asynchronous networks, the various base stations may be aligned on a frame boundary, but not SFN. Thus, in SFN-asynchronous networks, the PRS configuration index for each cell may be configured separately by the network so that PRS occasions align in time.

A UE may determine the timing of the PRS occasions of the reference and neighbor cells for positioning if the UE can obtain the cell timing (e.g., SFN) of at least one of the cells, for example, the reference cell or a serving cell. The UE may then derive the timing of the other cells based, for example, on the assumption that PRS occasions from different cells overlap.

For LTE systems, the sequence of subframes used to transmit PRS (e.g., for positioning) may be characterized and defined by a number of parameters, comprising: (i) a reserved block of bandwidth (BW), (ii) the configuration index $I_{PRS}$, (iii) the duration $N_{PRS}$, (iv) an optional muting pattern, and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the bandwidth (BW) value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of the LTE positioning protocol (LPP). A directional PRS may be configured as just described and may, for example, use a low PRS duty cycle (e.g., $N_{PRS}=1$, $T_{PRS}=160$ subframes) or a high duty cycle.

The present disclosure defines which set of parameters should be signaled to a UE to enable the UE to know exactly the time and frequency locations of the SSB(s) of a neighboring cell. The set of parameters may be signaled by, for example, the location server (e.g., location server 230, LMF 270, SLP 272) over LPP signaling, or the UE's serving cell. For intra frequency cells, the set of parameters include the following: (1) SFN or SFN offset with respect to the serving SFN, (2) subframe offset with respect to the serving subframe, and, (3) for each of a plurality of "sync channel rasters" (in case of multi-SSB there may be many): (a) the frequency where the SSB is transmitted (e.g., sync raster point, global synchronization channel number (GSCN), or NR absolute radio-frequency channel number (NRARFCN)), (b) the half-frame index (which half-frame, first or second, the burst of SSBs (i.e., a collection of consecutive SSBs) are configured), (c) the SSB-bitmap (indicating which SSB is ON or OFF in each SSB burst, also referred to as the SSB-position-in-burst), (d) the SSB periodicity (in ms), and (e) the SSB pattern (SCS and potentially the case number (e.g. A, B, C, D above)), which may be signaled in one or two bits. As will be appreciated, the SFN offset and the subframe offset is only one example of specifying the SSB offset in the time domain.

Note that parameters (1) and (2) above may also be included in the measurement assistance data, since they are needed to determine the PRS occasions. In addition, the term "sync channel raster" simply means the frequency where an SSB is transmitted. The frequency can be specified by the GSCN or NRARFCN. Further, in an aspect, the half frame index may be signaled by a one-bit value of "0" or "1" for the first and second halves, respectively. The SSB periodicity may be signaled in 3 bits, and the SSB pattern may be signaled in one or two bits, depending on the case number.

For inter frequency cells, it is mandatory to provide the "sync channel raster."

There should be some default behavior for the UE if any of the above SSB parameters are not provided for some cell. In LPP, the location server (e.g., location server 230, LMF 270, SLP 272) may configure a UE with the SSB parameters to enable the UE to determine the exact time and frequency locations of the SSBs for the neighboring cells. If any of the parameters (e.g., half-frame index, SSB bitmap, SSB periodicity, SCS) are not configured for one of the configured sync channel rasters of a neighboring cell, then the UE would assume that the corresponding parameter(s) are the same as that of the serving cell. If no sync channel raster is provided for a neighboring cell, then the UE assumes that it is the same as that of the serving cell. Note that if multiple sync channel rasters are provided, then the frequency (e.g., indicated by GSCN or NRARFCN) would also need to be provided.

Figure 9:
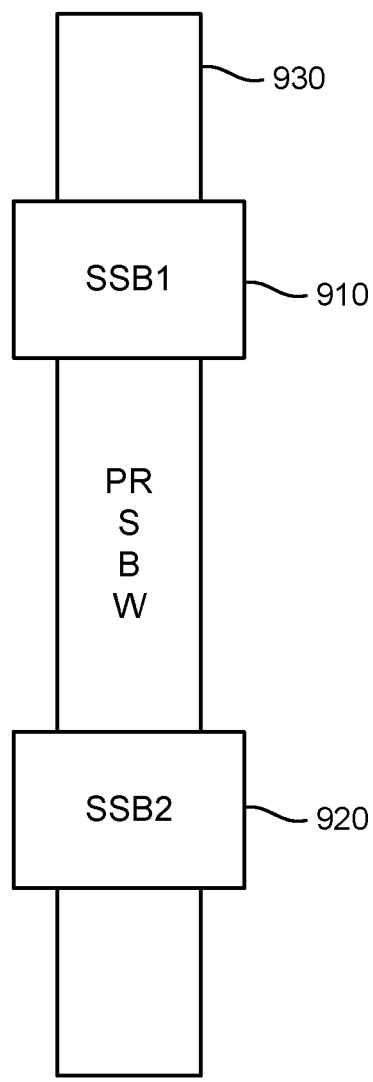
FIG. 9 illustrates two SSBs on different frequencies inside a PRS bandwidth, according to aspects of the disclosure.

Another issue to be addressed is how the UE is expected to use the assistance data for the SSBs of neighboring cells in the case of multiple SSBs inside the PRS bandwidth (BW) of a PRS configuration (e.g., PRS configuration 800), as illustrated in FIG. 9. Specifically, FIG. 9 illustrates two SSBs ("SSB1" 910 and "SSB2" 920) occupying different frequency resources inside the PRS bandwidth 930. In the case of multiple SSBs inside one PRS bandwidth, as in the example of FIG. 9, there are the following options. As a first option, the whole OFDM symbol carrying PRS can be punctured. As a second option, the transmitting cell is expected to puncture only the colliding PRBs, assuming that no more than some number "X" portions of consecutive bandwidths are created (three in the example of FIG. 9, one on each side of the SSBs), each one no less than a threshold of PRBs. In an aspect, the threshold of PRBs may equal the minimum number that can be configured as a PRS bandwidth (e.g., 24 PRBs).

A UE's ability to support the foregoing options depends on the UE's capabilities, and the UE can signal (e.g., to the location server or serving cell) which option(s) are supported. This message may include one bit representing which option is supported, the value of "X" (e.g., X=2, 3, 5), and the threshold (e.g., 4 PRBs, 24 PRBs).

Figure 10:
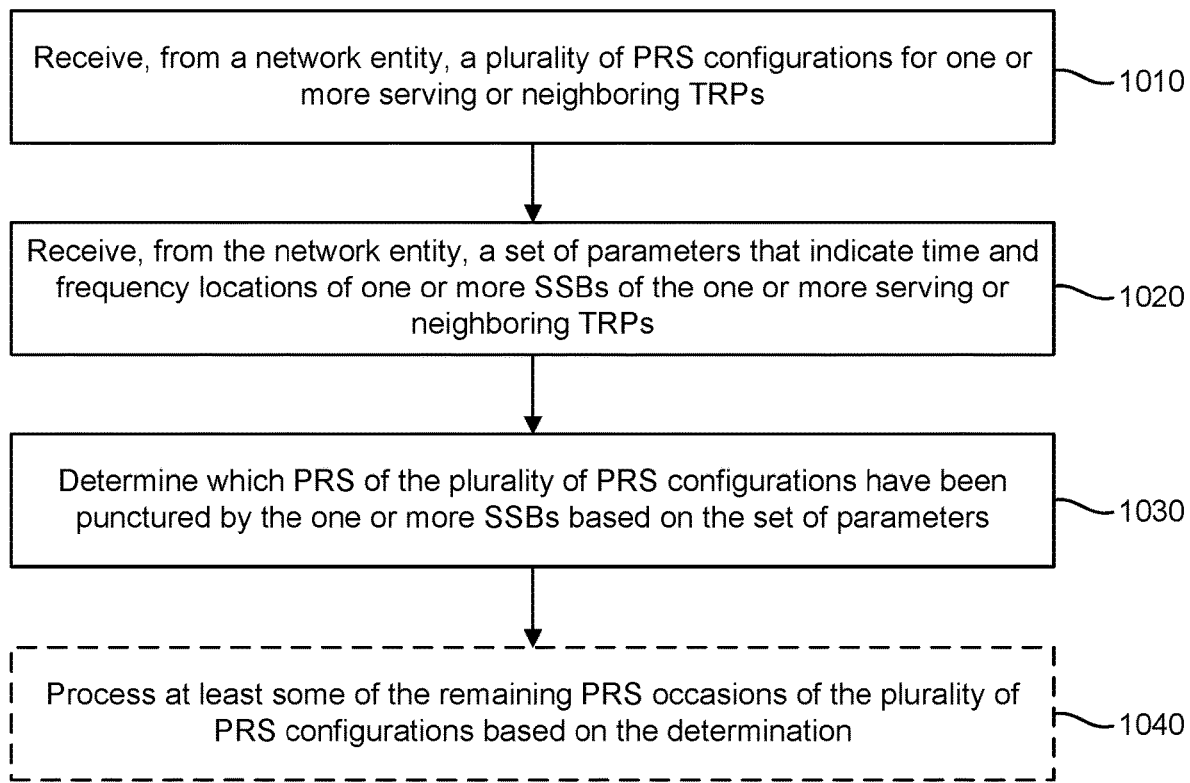
FIGS. 10 and 11 illustrate exemplary methods of wireless communication, according to aspects of the disclosure.

FIG. 10 illustrates an exemplary method 1000 of wireless communication, according to aspects of the disclosure. In an aspect, the method 1000 may be performed by a UE (e.g., any of the UEs described herein).

At 1010, the UE receives, from a network entity (e.g., a serving TRP, location server 230, LMF 270, SLP 272), a plurality of PRS configurations for one or more serving or neighboring TRPs. In an aspect, operation 1010 may be performed by WWAN transceiver 310, processing system 332, memory component 340, and/or positioning component 342, any or all of which may be considered means for performing this operation.

At 1020, the UE receives, from the network entity, a set of parameters that indicate time and frequency locations of one or more SSBs of the one or more serving or neighboring TRPs. In an aspect, operation 1020 may be performed by WWAN transceiver 310, processing system 332, memory component 340, and/or positioning component 342, any or all of which may be considered means for performing this operation.

At 1030, the UE determines which PRS of the plurality of PRS configurations have been punctured by the one or more SSBs based on the set of parameters. In an aspect, operation 1030 may be performed by WWAN transceiver 310, processing system 332, memory component 340, and/or positioning component 342, any or all of which may be considered means for performing this operation.

At 1040, the UE optionally processes at least some of the remaining PRS of the plurality of PRS configurations based on the determination. In an aspect, operation 1040 may be performed by WWAN transceiver 310, processing system 332, memory component 340, and/or positioning component 342, any or all of which may be considered means for performing this operation.

Figure 11:
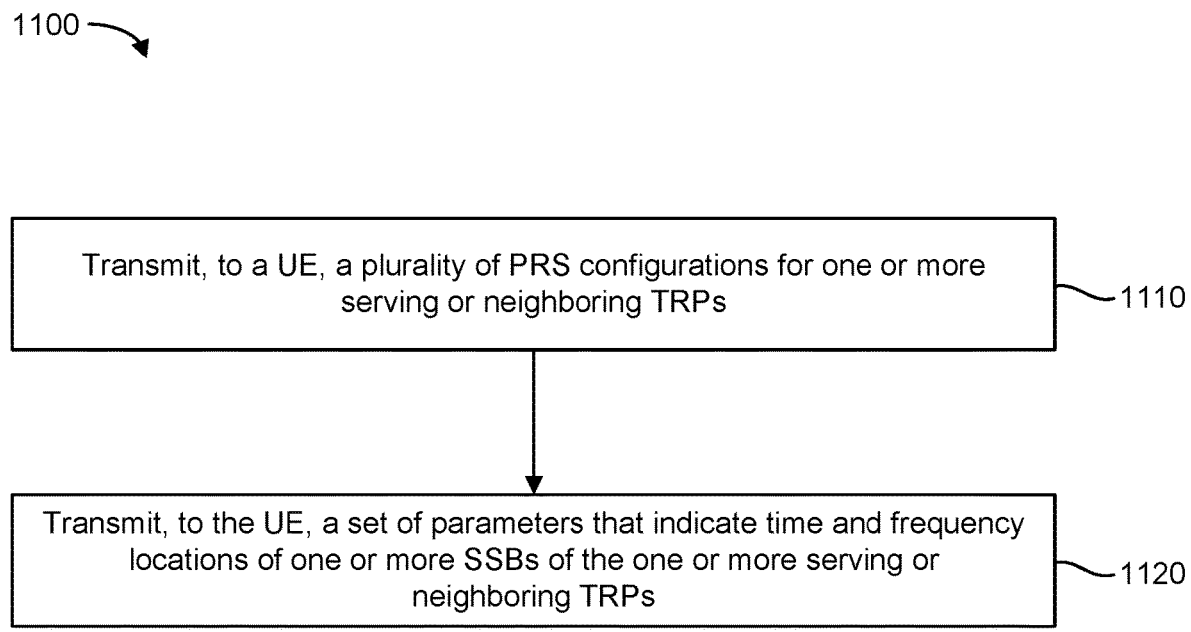

FIG. 11 illustrates an exemplary method 1100 of wireless communication, according to aspects of the disclosure. The method 1100 may be performed by a network entity (e.g., a serving TRP, location server 230, LMF 270, SLP 272).

At 1110, the network entity transmits, to a UE (e.g., any of the UEs described herein), a plurality of PRS configurations for one or more serving or neighboring TRPs. In an aspect, where the network entity is a location server, operation 1110 may be performed by network interface(s) 390, processing system 394, memory component 396, and/or positioning component 398, any or all of which may be considered means for performing this operation. In an aspect, where the network entity is a TRP, operation 1110 may be performed by WWAN transceiver 350, processing system 384, memory component 386, and/or positioning component 388, any or all of which may be considered means for performing this operation.

At 1120, the network entity transmits, to the UE, a set of parameters that indicate time and frequency locations of one or more SSBs of the one or more serving or neighboring TRPs. In an aspect, where the network entity is a location server, operation 1120 may be performed by network interface(s) 390, processing system 394, memory component 396, and/or positioning component 398, any or all of which may be considered means for performing this operation. In an aspect, where the network entity is a TRP, operation 1120 may be performed by WWAN transceiver 350, processing system 384, memory component 386, and/or positioning component 388, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
   receiving, from a network entity, a plurality of positioning reference signal (PRS) configurations for one or more serving or neighboring transmission-reception points (TRPs);
   receiving, from the network entity, a set of parameters that indicate time and frequency locations of one or more synchronization signal blocks (SSBs) of the one or more serving or neighboring TRPs; and
   determining which PRS of the plurality of PRS configurations have been punctured by the one or more SSBs based on the set of parameters.

2. The method of claim 1, further comprising:
   processing at least some remaining PRS of the plurality of PRS configurations based on the determination.

3. The method of claim 1, wherein an entirety of any orthogonal frequency division multiplexing (OFDM) symbol of a PRS that overlaps any part of a subset of physical resources of the one or more SSBs is punctured.

4. The method of claim 1, wherein a PRS is not mapped in any OFDM symbol that contains an SSB of a neighboring TRP.

5. The method of claim 1, wherein the set of parameters comprises:
   a frequency where the one or more SSBs are transmitted,
   a half-frame index indicating in which half-frame a burst of the one or more SSBs are configured,
   an SSB-position-in-burst indicating which of the one or more SSBs are ON or OFF in each SSB burst,
   an SSB periodicity,
   an SSB offset,
   an SSB pattern or SSB subcarrier spacing (SCS),
   a system frame number (SFN) offset of the SSB, or
   any combination thereof.

6. The method of claim 5, wherein the SSB offset is indicated by an SFN offset and a subframe offset.

7. The method of claim 5, wherein, based on any of the set of parameters not being configured for a neighboring TRP, the UE treats non-configured parameters as the same as for a serving TRP.

8. The method of claim 1, wherein:
the one or more SSBs are transmitted on multiple frequencies, and
the set of parameters for the one or more SSBs is for all of the multiple frequencies.

9. The method of claim 1, wherein the set of parameters is only for frequencies that overlap with a PRS bandwidth of the plurality of PRS configurations.

10. The method of claim 1, wherein:
there is a plurality of carriers, and
the set of parameters specifies a raster for each of the plurality of carriers and where the one or more SSBs are located.

11. The method of claim 1, wherein only overlapping resources in time and frequency are punctured.

12. The method of claim 11, wherein only overlapping physical resources in time and frequency are punctured based on no more than a given number of portions of consecutive PRS bandwidths being created, and each one having no less than a threshold number of physical resources.

13. The method of claim 12, wherein:
the physical resources comprise physical resource blocks (PRBs), and
the threshold number is a minimum number of PRBs that can be configured for a PRS bandwidth.

14. A method of wireless communication performed by a network entity, comprising:
transmitting, to a user equipment (UE), a plurality of positioning reference signal (PRS) configurations for one or more neighboring transmission-reception points (TRPs); and
transmitting, to the UE, a set of parameters that indicate time and frequency locations of one or more synchronization signal blocks (SSBs) of the one or more neighboring TRPs, wherein the set of parameters comprises a half-frame index indicating in which half-frame a burst of the one or more SSBs are configured and an SSB-position-in-burst indicating which of the one or more SSBs are ON or OFF in each SSB burst, wherein the set of parameters is for frequencies that overlap with a PRS bandwidth of the plurality of PRS configurations, and wherein each of the one or more SSBs comprises at least one primary synchronization signal (PSS), at least one secondary synchronization signal (SSS), and at least one physical broadcast channel (PBCH).

15. The method of claim 14, wherein the set of parameters further comprises:
a frequency where the one or more SSBs are transmitted,
an SSB periodicity,
an SSB offset,
an SSB pattern or SSB subcarrier spacing (SCS),
a system frame number (SFN) offset of the SSB, or
any combination thereof.

16. The method of claim 15, wherein the SSB offset is indicated by an SFN offset and a subframe offset.

17. The method of claim 14, wherein an entirety of any orthogonal frequency division multiplexing (OFDM) symbol of a PRS that overlaps any part of a subset of physical resources of the one or more SSBs is punctured.

18. The method of claim 14, wherein a PRS is not mapped in any OFDM symbol that contains an SSB of a neighboring TRP.

19. The method of claim 14, wherein the one or more SSBs are transmitted on multiple frequencies.

20. The method of claim 14, wherein:
there is a plurality of carriers, and
the set of parameters specifies a raster for each of the plurality of carriers and where the one or more SSBs are located.

21. The method of claim 14, wherein only overlapping resources in time and frequency are punctured.

22. The method of claim 21, wherein only overlapping physical resources in time and frequency are punctured based on no more than a given number of portions of consecutive PRS bandwidths being created, and each one having no less than a threshold number of physical resources.

23. The method of claim 22, wherein:
the physical resources comprise physical resource blocks (PRBs), and
the threshold number is a minimum number of PRBs that can be configured for a PRS bandwidth.

24. A user equipment (UE), comprising:
a memory;
at least one transceiver; and
at least one processor communicatively coupled to the memory and the at least one transceiver, the at least one processor configured to:
receive, from a network entity via the at least one transceiver, a plurality of positioning reference signal (PRS) configurations for one or more serving or neighboring transmission-reception points (TRPs);
receive, from the network entity via the at least one transceiver, a set of parameters that indicate time and frequency locations of one or more synchronization signal blocks (SSBs) of the one or more serving or neighboring TRPs; and
determine which PRS of the plurality of PRS configurations have been punctured by the one or more SSBs based on the set of parameters.

25. The UE of claim 24, wherein the at least one processor is further configured to:
process at least some remaining PRS of the plurality of PRS configurations based on the determination.

26. The UE of claim 24, wherein an entirety of any orthogonal frequency division multiplexing (OFDM) symbol of a PRS that overlaps any part of a subset of physical resources of the one or more SSBs is punctured.

27. The UE of claim 24, wherein a PRS is not mapped in any OFDM symbol that contains an SSB of a neighboring TRP.

28. The UE of claim 24, wherein the set of parameters comprises:
a frequency where the one or more SSBs are transmitted,
a half-frame index indicating in which half-frame a burst of the one or more SSBs are configured,
an SSB-position-in-burst indicating which of the one or more SSBs are ON or OFF in each SSB burst,
an SSB periodicity,
an SSB offset,
an SSB pattern or SSB subcarrier spacing (SCS),
a system frame number (SFN) offset of the SSB, or
any combination thereof.

29. The UE of claim 24, wherein:
the one or more SSBs are transmitted on multiple frequencies, and
the set of parameters for the one or more SSBs is for all of the multiple frequencies.

* * * * *